W. M. FULTON.
TEMPERATURE REGULATOR.
APPLICATION FILED AUG. 24, 1916.
1,358,071.
Patented Nov. 9, 1920.
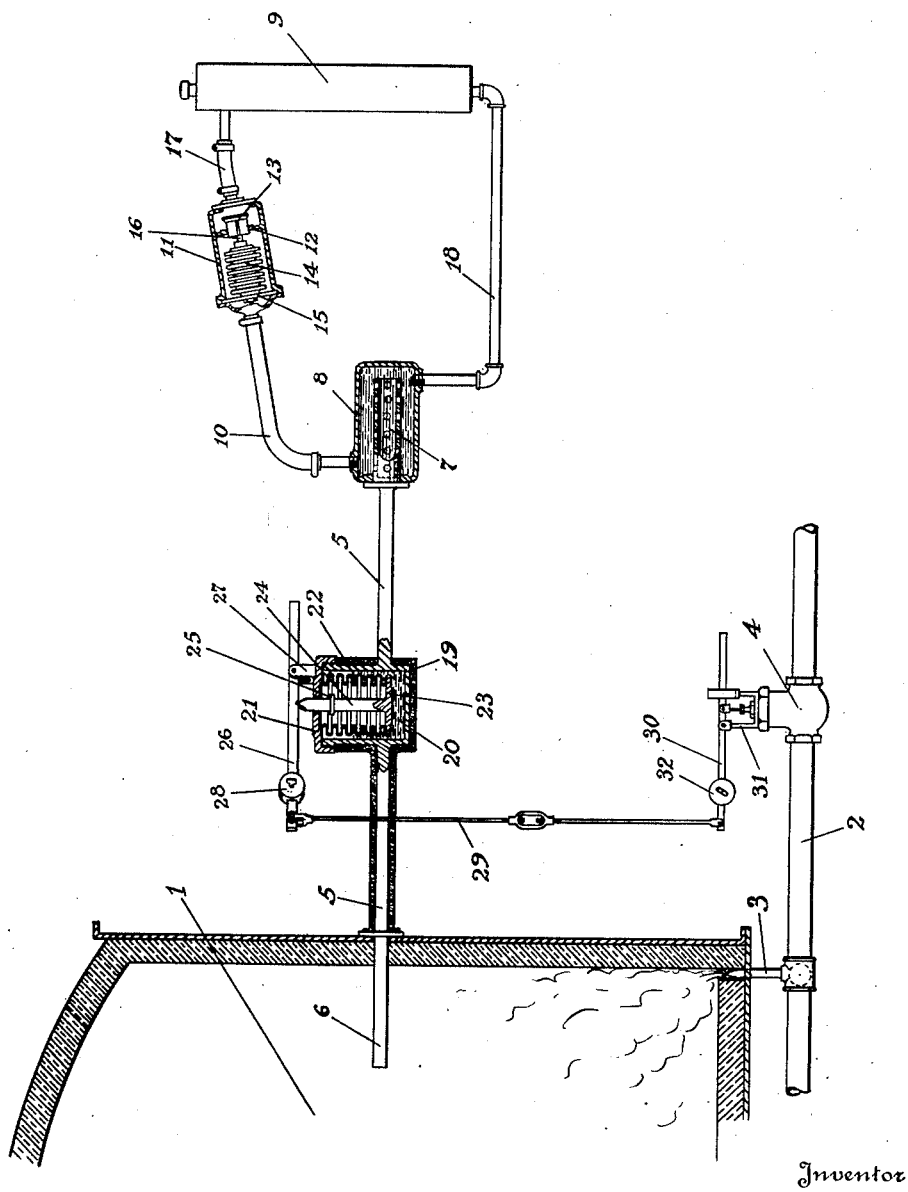
Inventor
Weston M. Fulton,
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TEMPERATURE-REGULATOR.

1,358,071.     Specification of Letters Patent.     Patented Nov. 9, 1920.

Application filed August 24, 1916. Serial No. 116,728.

*To all whom it may concern:*

Be it known that I, WESTON M. FULTON, a citizen of the United States of America, and a resident of Knoxville, Tennessee, have invented a new and useful Improvement in Temperature-Regulators, which invention is fully set forth in the following specification.

This invention relates to a regulator which is responsive to temperature variations, and it has for its object to provide a device of this kind which, while capable of use under a wide variety of temperature desired conditions, has particular utility in the regulation of relatively high temperatures.

It is a known law of physics that, if a conductor of heat have a determinate difference of temperature between two portions thereof, the temperature at any intermediate portion is calculable from a knowledge of the physical characteristics of the conductor. It is an object of this invention to utilize this law of physics in the provision of a regulator which is responsive to temperature variations that are different from but vary in a predeterminate relation to those of a source of heat, said regulator preferably responding to temperature conditions intermediate those of said source of heat and those of a different source of heat, which latter is preferably maintained at a substantially uniform temperature. A further object of this invention is to provide a regulator wherein the thermostat is itself not subjected to the source of heat whereby temperatures may be regulated that are too high or low for the direct subjection thereto of the thermostat. Other objects will appear as the description proceeds.

Stated briefly, this invention comprises, in combination with a source of heat and means to be controlled, means constituting a conductor of heat, one portion whereof is subjected to the source of heat, a second portion whereof is subjected to a substantially different temperature which is preferably maintained uniform and a third and preferably intermediate portion whereof is utilized as the temperature control, a thermosensitive means being positioned in operative or heat-interchanging relation to the latter portion and operatively related to the means to be controlled.

The invention is capable of receiving a variety of mechanical expressions, one of which, for the purposes of illustration, has been shown on the accompanying drawing. But it is to be expressly understood that the drawing is for the purposes of illustration only, and is not to be construed as a definition of the limits of the invention, reference being had to the appended claims for that purpose.

The drawing shows a schematic elevation of a temperature regulator embodying the present invention, certain portions being shown in section.

Referring in detail to the drawing, 1 represents a source of heat, shown as a furnace, 2 a conduit for supplying a heating medium to said source of heat, as a combustible gas, (3 representing diagrammatically the burners,) and 4 a valve housing in the conduit 2. The valve may be of any suitable construction, and while a throttle valve has been diagrammatically indicated, it is to be expressly understood that a snap valve could be used equally well, a by-pass communicating with a pilot light being provided in the latter case. This valve, however, is to be taken as symbolical of any suitable means to be controlled.

Means are provided which constitute a conductor of heat. This conductor 5 may be of any suitable material or materials and of any suitable shape or cross section. One portion of the conductor, as the end 6, is subjected to the source of heat; in the embodiment illustrated on the drawing such end extends into the furnace 1 and of necessity is of such material as to withstand the heat within such furnace.

A second portion of the conductor of heat is subjected to a substantially different temperature and preferably takes the form of a heat-dissipating means so that, by transmission of a substantial amount of heat between said portion and the surrounding medium, said second portion has a substantially different temperature from that of the first-named portion. By preference said second portion is maintained at a substantially uniform temperature by any suitable means, the preferred embodiment of the invention comprising a means or system for circulating a cooling medium in operative or heat-interchanging relation with this latter portion of the conductor. Said conductor in the form shown has its end 7 constituted by a tubular shell provided with a plurality of apertures whereby a cooling medium may be circulated through the same, said end 7 being surrounded by a casing 8 through which the cooling medium is passed. That the cooling system may maintain the end 7 of the conductor 5 at a substantially uniform temperature, means may be provided in the system, as a conventional radiator 9, for radiating from the cooling medium circulating through the system the heat that it has absorbed from the end 7 of the conductor, and means are also preferably provided for regulating the flow of the cooling medium through the system in accordance with the temperature needs of the system, such means being shown as a thermosensitive device automatically controlled by the temperature of such medium. In the embodiment illustrated a conduit 10 conducts the cooling medium from the casing 8 to and through a valve housing 11 provided interiorly with a partition 12 having a valve port controlled by a valve member 13. While a seating valve has been shown, it is to be understood that any other suitable form of valve may be employed. Thermosensitive means are subjected to the temperature of the fluid flowing through the housing 11, and operatively connected to the valve member 13. In the form shown, an expansible and collapsible vessel 14, charged with a volatile thermosensitive fluid, is suitably mounted in the housing 11, as by a bridge plate 15, and has its movable end wall connected to the valve member 13 by a stem 16. From the opposite end of the valve housing 11 a conduit 17 conducts the cooling medium to the radiator 9, a conduit 18 connecting the outlet of the radiator to the casing 8.

Thermosensitive means are positioned in operative or heat-interchanging relation with a portion of the conductor 5 intermediate of the aforesaid portions which are subjected to the source of heat and maintained at a substantially uniform temperature, which thermosensitive means may be of any suitable construction. In the form shown the conductor 5 is enlarged to provide a container 19 for a volatile thermosensitive fluid 20, said container 19 being closed by a cover 21. Positioned within the container 19 and having one end secured in fixed relation thereto, is an expansible and collapsible vessel 22 having its opposite end closed by a rigid plate 23 attached, as by brazing or in any other suitable manner, to the end corrugation of the vessel 22. Projecting upwardly within the vessel 22 is a stem 24 attached to or integral with the end wall 23, such stem passing loosely through an aperture in the cover 21 and a stop 25 being provided to limit its upward movement. The upper end of the stem 24 is operatively connected with the means to be controlled, as the valve within the housing 4.

In the embodiment illustrated a lever 26 is pivoted on a bracket 27 mounted on the cover 21, and has one end weighted, as illustrated at 28. The weighted end of this lever is connected, as by an adjustable link 29, with one end of a lever 30 pivoted on a bracket 31 mounted upon the valve housing 4, a weight 32 being provided on the lever 30 adjacent the end connected to the link 29. Stem 24 operatively engages the lever 26 and the stem of the valve within the housing 4 is operatively connected to the lever 30 in such a manner that increase of pressure exteriorly of the vessel 22, with a consequent contraction of the same, produces a closing of the valve in the housing 4, while an expansion of the vessel 22 conversely produces an opening of such valve.

End 7 of the conductor of heat 5 being maintained at a substantially uniform temperature, the temperature of such conductor at the position of the thermosensitive means, will bear a definite relation to the temperature at the end 6 of such conductor. With a knowledge of the physical characteristics of this conductor, said relation of the temperatures at the end 6 and at the thermosensitive means can be readily calculated. Therefore the thermosensitive means may be initially set to produce a predetermined effect upon the means to be controlled upon said end 6 reaching any predetermined temperature, in accordance with the known laws of conduction of heat. Furthermore, given an approximate temperature at the end 6, a portion intermediate such end and the end 7 which is maintained at substantially uniform temperature may be selected having a temperature best adapted to the operation of the thermosensitive means and to the obtaining of the desired effect upon the means to be controlled.

In operation, the end 6 of the conductor 5 will absorb heat from the source of heat, and conduct the same to the end 7. The latter end will be maintained at a substantially uniform temperature by the circulation of the cooling medium through the system there provided, such circulation being automatically controlled by the temperature of the cooling medium operating upon the expansible and collapsible vessel 14 to adjust the valve 13 and regulate the flow of said cooling medium. The temperature at the intermediate point of said conductor, whereat the thermosensitive means is positioned, will be determinate from the gradient of temperature between the ends 6 and 7, and will vary in proportion to the variations of temperature at the end 6. An increase of temperature at the end 6 will result in a volatilization of the fluid within the container 19, collapsing the vessel 22 to close the valve within the housing 4. Conversely, a decrease of the temperature at the end 6 will result in a condensation of the fluid within the container 19 and a decrease of pressure on the vessel 22, allowing it to expand and effect the opening of the valve in the housing 4.

While the invention has been described as applied to the regulation of the temperature in a gas furnace because this invention has particular utility when applied to the regulation of very high temperatures, it is to be expressly understood that the invention is capable of use in the regulation of any suitable temperature. Furthermore, as low temperatures represent but a proportionate absence of heat, the invention is equally applicable to the regulation of very cold temperatures. In the latter event end 7 maintained at a substantially uniform temperature would be the "hot end," and there would be a determinate rise in temperature from the end 6 to the end 7. The thermosensitive means at the intermediate portion would, however, properly actuate the means to be controlled in accordance with the variations in the temperature at the end of the conductor subjected to the low temperatures. Therefore it is to be expressly understood that the term "source of heat," when used in the claims, is to be construed as covering heat conditions representing either high or low temperatures.

What is claimed is:

1. In combination with a source of heat and means to be controlled, a conductor of heat having one portion subjected to said source of heat, means maintaining another portion of said conductor at a substantially uniform temperature, and thermosensitive means subjected to an intermediate portion of said conductor and operatively related to said means to be controlled.

2. In combination with a source of heat and means to be controlled, means subjected at one portion to said source of heat and maintained at another portion at a substantially uniform temperature, and thermosensitive means subjected to the temperature of an intermediate portion of said last-named means and operatively related to said means to be controlled.

3. In combination with a source of heat and means to be controlled, a conductor of heat having one portion subjected to said source of heat and a second portion providing a means for transmitting heat between said conductor and the surrounding medium whereby said portion has a substantially different temperature from that of said source of heat, and thermosensitive means subjected to the temperature of another portion of said conductor and operatively related to said means to be controlled.

4. In combination with a source of heat and means to be controlled, means subjected at one portion to said source of heat and subjected to a substantially different temperature at another portion thereof, and thermosensitive means subjected to and controlled by the heat transmitted by said first-named means to an intermediate portion thereof, said thermosensitive means being operatively related to said means to be controlled.

5. In combination with a source of heat and means to be controlled, a conductor of heat having one portion subjected to said source of heat, means maintaining another portion of said conductor at a substantially uniform temperature and comprising means for circulating a cooling medium in operative relation to said conductor, and thermosensitive means subjected to an intermediate portion of said conductor and operatively related to said means to be controlled.

6. In combination with a source of heat and means to be controlled, a conductor of heat having one portion subjected to said source of heat, means maintaining another portion of said conductor at a substantially uniform temperature, said last-named means comprising means for circulating a cooling medium in operative relation to said conductor and a radiator through which said cooling medium is passed, and thermosensitive means subjected to an intermediate portion of said conductor and operatively related to said means to be controlled.

7. In combination with a source of heat and means to be controlled, a conductor of heat having one portion subjected to said source of heat, means maintaining another portion of said conductor at a substantially uniform temperature and comprising a system for circulating a cooling medium in operative relation to said conductor, said system comprising means for regulating the flow of cooling medium through said system, and thermosensitive means subjected to an intermediate portion of said conductor and operatively related to said means to be controlled.

8. In combination with a source of heat and means to be controlled, a conductor of heat having one portion subjected to said source of heat, means maintaining another portion of said conductor at a substantially uniform temperature and comprising a system for circulating a cooling medium in operative relation to said conductor, said system comprising thermosensitive means for regulating the flow of cooling medium through said system, and thermosensitive means subjected to an intermediate portion of said conductor and operatively related to said means to be controlled.

9. In combination with a source of heat and means to be controlled, a conductor of heat having one portion subjected to said source of heat, means maintaining another portion of said conductor at a substantially uniform temperature and comprising a system for circulating a cooling medium in operative relation to said conductor, said system comprising means automatically controlled by the temperature of the cooling medium for regulating the flow of cooling medium through said system, and thermosensitive means subjected to an intermediate portion of said conductor and operatively related to said means to be controlled.

10. In combination with a source of heat and means to be controlled, a conductor of heat having one portion subjected to said source of heat, means maintaining another portion of said conductor at a substantially uniform temperature and comprising a system for circulating a cooling medium in operative relation to said conductor, said system comprising a valve for regulating the flow of cooling medium through said system and thermosensitive means subjected to said cooling medium and operatively connected with said valve, and thermosensitive means subjected to an intermediate portion of said conductor and operatively related to said means to be controlled.

11. In combination with a source of heat and means to be controlled, a conductor of heat having one portion subjected to said source of heat, means maintaining another portion of said conductor at a substantially uniform temperature, an expansible and collapsible vessel under the pressure of a volatile fluid subjected to an intermediate portion of said conductor, and operative connections between the movable wall of said vessel and said means to be controlled.

12. In combination with a source of heat and means to be controlled, a conductor of heat having one portion subjected to said source of heat, means maintaining another portion of said conductor at a substantially uniform temperature and comprising means for circulating a cooling medium in operative relation to said conductor, an expansible and collapsible vessel under the pressure of a volatile fluid subjected to an intermediate portion of said conductor, and operative connections between the movable wall of said vessel and said means to be controlled.

13. In combination with a source of heat and means to be controlled, a conductor of heat having one portion subjected to said source of heat, means maintaining another portion of said conductor at a substantially uniform temperature, a container for a volatile fluid intermediate the aforesaid portions of said conductor, an expansible and collapsible vessel in said container and exteriorly subjected to the pressure of said fluid, and operative connections between the movable wall of said vessel and said means to be controlled.

14. In combination with a source of heat and means to be controlled, means subjected at one portion to said source of heat and maintained at another portion at a substantially uniform temperature, an expansible and collapsible vessel under the pressure of a volatile fluid subjected to an intermediate portion of said means, and operative connections between the movable wall of said vessel and said means to be controlled.

15. In combination with a source of heat and means to be controlled, means subjected at one portion to said source of heat, means for circulating a cooling medium in operative relation to another portion of said last-named means, and thermosensitive means subjected to an intermediate portion of the aforesaid means and operatively related to said means to be controlled.

16. In combination with a source of heat and means to be controlled, a conductor of heat having one portion subjected to said source of heat, an expansible and collapsible vessel subjected to the pressure of a volatile fluid, said vessel being in operative relation to another portion of said conductor, said conductor having a third portion for dissipating heat whereby it is maintained at a substantially different temperature from that of said first named portion, and operative connections between the movable wall of said vessel and said means to be controlled.

17. In combination with a source of heat, means supplying a heating medium thereto, means for regulating the supply of heating medium, a conductor of heat having one portion subjected to said source of heat, means maintaining another portion of said conductor at a substantially uniform temperature, and thermosensitive means subjected to an intermediate portion of said conductor and operatively connected to said regulating means.

18. In combination with a source of heat, means supplying a heating medium thereto, means for regulating the supply of heating medium, means subjected at one portion to said source of heat and maintained at another portion at a substantially uniform temperature, and thermosensitive means subjected to the temperature of an intermediate portion of said last-named means and operatively connected to said regulating means.

19. In combination with a source of heat, means supplying a heating medium thereto, means for regulating the supply of heating medium, a conductor of heat having one portion subjected to said source of heat and a second portion constituting a heat-dissipating portion whereby it has a substantially different temperature from that of said source of heat, and thermosensitive means subjected to the temperature of another portion of said conductor and operatively connected to said regulating means.

20. In combination with a source of heat, means supplying a heating medium thereto, means for regulating the supply of heating medium, a conductor of heat having one portion subjected to said source of heat, means maintaining another portion of said conductor at a substantially uniform temperature and comprising means for circulating a cooling medium in operative relation to said conductor, and thermosensitive means subjected to an intermediate portion of said conductor and operatively connected to said regulating means.

21. In combination with a source of heat, means supplying a heating medium thereto, means for regulating the supply of heating medium, a conductor of heat having one portion subjected to said source of heat, means maintaining another portion of said conductor at a substantially uniform temperature, an expansible and collapsible vessel under the pressure of a volatile fluid subjected to an intermediate portion of said conductor, and operative connections between the movable wall of said vessel and said regulating means.

22. In combination with a source of heat, means supplying a heating medium thereto, means for regulating the supply of heating medium, a conductor of heat having one portion subjected to said source of heat, means maintaining another portion of said conductor at a substantially uniform temperature and comprising a system for circulating a cooling medium in operative relation to said conductor, said system comprising means automatically controlled by the temperature of the cooling medium for controlling the flow of cooling medium through said system, and thermosensitive means subjected to an intermediate portion of said conductor and operatively connected to said regulating means.

23. In combination with means to be controlled, a conductor of heat, means subjecting said conductor to different temperatures at different portions thereof, and thermosensitive means subjected to an intermediate portion of said conductor and operatively related to said means to be controlled.

24. In combination with means to be controlled, a conductor of heat, means subjecting said conductor to different temperatures at different portions thereof, and an expansible and collapsible vessel under the pressure of a volatile fluid subjected to an intermediate portion of said conductor and operatively related to said means to be controlled.

In testimony whereof I have signed this specification.

WESTON M. FULTON.